(12) United States Patent
Norisada et al.

(10) Patent No.: US 9,287,790 B2
(45) Date of Patent: Mar. 15, 2016

(54) ELECTRIC POWER CONVERTER

(71) Applicant: Panasonic Intellectual Property Management Co., Ltd., Osaka (JP)

(72) Inventors: Takaaki Norisada, Osaka (JP); Keiji Akamatsu, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/565,460

(22) Filed: Dec. 10, 2014

(65) Prior Publication Data

US 2015/0180356 A1  Jun. 25, 2015

(30) Foreign Application Priority Data

Dec. 24, 2013  (JP) .................. 2013-265781

(51) Int. Cl.
*H02M 3/335* (2006.01)
*H02M 1/14* (2006.01)

(52) U.S. Cl.
CPC ............ *H02M 3/33546* (2013.01); *H02M 1/14* (2013.01)

(58) Field of Classification Search
CPC .......... H02M 3/33576; H02M 3/3376; H02M 7/53871; H02M 3/33507; H02M 7/4807; H02M 2001/0048; H02M 3/33584; H02M 1/4233; Y02B 70/126; Y02B 70/1433; Y02B 70/1441
USPC ............ 363/15–17, 95, 97–98, 131–132, 153
See application file for complete search history.

(56) References Cited

U.S. PATENT DOCUMENTS

| 4,843,202 | A | * | 6/1989 | Smith et al. .................... 219/716 |
| 5,539,630 | A | * | 7/1996 | Pietkiewicz et al. ............ 363/17 |
| 6,297,616 | B1 | * | 10/2001 | Kubo et al. ..................... 320/116 |
| 2005/0270806 | A1 | * | 12/2005 | Zhu ................................. 363/17 |
| 2008/0212340 | A1 | * | 9/2008 | Tao et al. ......................... 363/17 |

FOREIGN PATENT DOCUMENTS

| JP | 2009-060759 | 3/2009 |
| JP | 2010-088150 | 4/2010 |
| JP | 2012-085378 | 4/2012 |
| JP | 2012-085465 | 4/2012 |
| JP | 2012-105467 | 5/2012 |
| JP | 2012-222951 | 11/2012 |
| JP | 2012-249410 | 12/2012 |

* cited by examiner

*Primary Examiner* — Adolf Berhane
*Assistant Examiner* — Henry Lee, III
(74) *Attorney, Agent, or Firm* — McDermott Will & Emery LLP

(57) ABSTRACT

An electric power converter includes a capacitor, a bridge circuit that includes a plurality of switching elements, a transformer, a secondary side rectifier circuit, a smoothing circuit, a detector that detects a value based on at least one of a capacitor voltage and a current flowing from the capacitor, and a control device that outputs a primary side drive signal to turns on/off each of the plurality of switching elements at a switching frequency, the control device increasing the switching frequency when the detected value increases, the control device reducing the switching frequency when the detected value decreases.

20 Claims, 8 Drawing Sheets

CAPACITOR VOLTAGE

OUTPUT VOLTAGE

OUTPUT CURRENT

SWITCHING FREQUENCY

CONTROL PHASE AMOUNT

CAPACITOR VOLTAGE

OUTPUT VOLTAGE

OUTPUT CURRENT

SWITCHING FREQUENCY

CONTROL PHASE AMOUNT

DRIVE SIGNAL(S3)

DRIVE SIGNAL(S1)

DRIVE SIGNAL(S2)

DRIVE SIGNAL(S4)

TRANSFORMER VOLTAGE

TRANSFORMER CURRENT

CC

ELECTRIC POWER CONVERTER

CROSS REFERENCES TO RELATED APPLICATIONS

This application claims priority to Japanese Patent Application No. 2013-265781, filed on Dec. 24, 2013, the contents of which are hereby incorporated by reference.

BACKGROUND

1. Technical Field

The present disclosure relates to electric power converters that convert AC voltages to DC voltages.

2. Description of the Related Art

An AC-DC converter that converts an AC voltage to a DC voltage includes, for example, a rectifier circuit that rectifies full waves of the AC voltage. An output voltage of the rectifier circuit includes a ripple or pulsation. It is desired that a ripple be reduced in order to generate a high-quality DC voltage. In order to reduce a ripple, an AC-DC converter may include a large-capacity capacitor at a later stage of a rectifier circuit. In this case, however, the size of the circuit increases, and the cost increases as well.

Japanese Unexamined Patent Application Publication No. 2012-222951 discloses a method for generating output electric power with desired small pulsation by controlling the duty ratio of a primary voltage in a switching circuit.

SUMMARY

The present disclosure provides a technique that makes it possible to reduce a ripple generated when converting an AC voltage to a DC voltage.

An electric power converter according to an embodiment of the present disclosure includes a capacitor, a bridge circuit, a transformer, a secondary side rectifier circuit, a smoothing circuit, a detector, and a control device. The capacitor smooths a first rectified voltage to generate a capacitor voltage. The bridge circuit includes a plurality of switching elements. The bridge circuit converts the capacitor voltage to a primary side AC voltage. The transformer includes a primary winding connected to the bridge circuit and a secondary winding electromagnetically coupled to the primary winding. The transformer converts the primary side AC voltage to a secondary side AC voltage. The secondary side rectifier circuit is connected to the secondary winding. The secondary side rectifier circuit rectifies the secondary side AC voltage to generate a second rectified voltage. The smoothing circuit smooths the second rectified voltage. The detector detects a value based on at least one of the capacitor voltage and a current flowing from the capacitor. The control device outputs a primary side drive signal that turns on/off each of the plurality of switching elements at the switching frequency. The control device increases the switching frequency when the detected value increases. The control device reduces the switching frequency when the detected value decreases.

These comprehensive or specific embodiments may be implemented as a charging system for a secondary battery, a vehicle, a control device, or a controlling method, or may be implemented through a desired combination of the above.

According to the present disclosure, a ripple generated when converting an AC voltage to a DC voltage can be reduced.

Additional benefits and advantages of the disclosed embodiments will be apparent from the specification and drawings. The benefits and/or advantages may be individually provided by the various embodiments and features of the specification and drawings, and need not all be provided in order to obtain one or more of the same.

DETAILED DESCRIPTION

Overview of Embodiments

Figure 1:
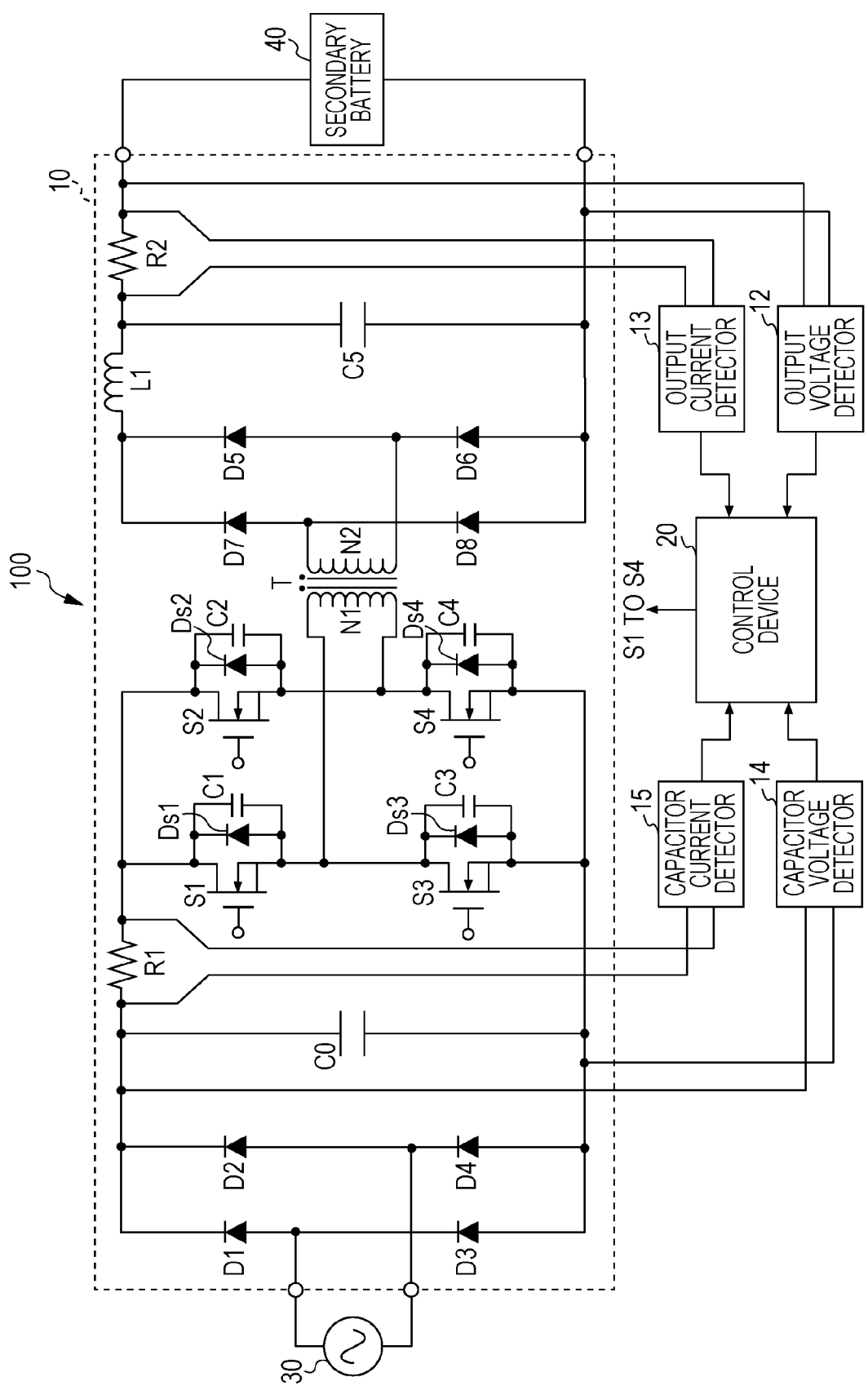
FIG. 1 illustrates a configuration example of an electric power converter according to an embodiment.

An electric power converter according to an embodiment of the present disclosure includes a capacitor, a bridge circuit, a transformer, a secondary side rectifier circuit, a smoothing circuit, a detector, and a control device. The capacitor smooths a first rectified voltage to generate a capacitor voltage. The bridge circuit includes a plurality of switching elements. The bridge circuit converts the capacitor voltage to a primary side AC voltage. The transformer includes a primary winding connected to the bridge circuit and a secondary winding electromagnetically coupled to the primary winding. The transformer converts the primary side AC voltage to a secondary side AC voltage. The secondary side rectifier circuit is connected to the secondary winding. The secondary side rectifier circuit rectifies the secondary side AC voltage to generate a second rectified voltage. The smoothing circuit smooths the second rectified voltage. The detector detects a value based on at least one of the capacitor voltage and a current flowing from the capacitor. The control device outputs a primary side drive signal to turns on/off each of the plurality of switching elements at a switching frequency. The control device increases the switching frequency when the detected value increases. The control device reduces the switching frequency when the detected value decreases.

When the detected value is large, the switching frequency is increased, causing electric power drawn from the primary winding of the transformer to the secondary winding to be decreased. When the detected value is small, the switching frequency is reduced, causing electric power drawn from the primary winding of the transformer to the secondary winding to be increased. Through this, a ripple generated when converting an AC voltage to a DC voltage can be suppressed.

The electric power converter according to the embodiment of the present disclosure may further include, for example, a secondary side switching circuit and an output detector. The secondary side switching circuit may include a plurality of secondary side switching elements. The secondary side switching circuit may turn on/off electrical conduction between the secondary winding and the smoothing circuit. The output detector may detect an output value based on at least one of an output voltage and an output current from the smoothing circuit. The smoothing circuit may include a secondary side capacitor and a coil that is disposed on a current path extending between the secondary side capacitor and the secondary side rectifier circuit. The control device may determine a phase difference between the primary side drive signal and a secondary side drive signal on the basis of the output value and may output the secondary side drive signal to turn on/off each of the plurality of secondary side switching elements with a phase in accordance with the phase difference.

As the frequency of the primary side drive signal is controlled, a ripple can be suppressed. In addition, as the phase of the secondary side drive signal is controlled, the output current and/or the output voltage can be adjusted. In other words, the frequency control for suppressing a ripple and the phase control for adjusting the output can be separated. This enables drive signals for the respective switching elements to be controlled with higher precision.

In the electric power converter according to the embodiment of the present disclosure, for example, the control device may increase the phase difference when the output value increases and reduce the phase difference when the output value decreases.

When the output value is large, the phase difference is increased, causing electric power drawn from the primary winding of the transformer to the secondary winding to be decreased. When the output value is small, the phase difference is reduced, causing electric power drawn from the primary winding of the transformer to the secondary winding to be increased. This enables the output current and/or the output voltage to be adjusted.

In the electric power converter according to the embodiment of the present disclosure, the secondary side switching circuit may include, for example, a first secondary side switching element and a second secondary side switching element. The first secondary side switching element may be disposed on a current path extending between one end of the secondary winding and one end of the smoothing circuit or on a current path extending between another end of the secondary winding and another end of the smoothing circuit. The second secondary side switching element may be disposed on a current path extending between the other end of the secondary winding and the one end of the smoothing circuit or on a current path extending between the one end of the secondary winding and the other end of the smoothing circuit. The control device may complementarily turn on/off the first secondary side switching element and the second secondary side switching element.

In the electric power converter according to the embodiment of the present disclosure, for example, the primary side drive signal may turn on/off the plurality of switching elements at a fixed duty ratio and with a fixed phase, and the secondary side drive signal may turn on/off the plurality of secondary side switching elements at a fixed duty ratio and with a phase that is set in accordance with the output value.

As the frequency of the primary side drive signal is controlled, a ripple can be suppressed. In addition, as the phase of the secondary side drive signal is controlled, the output current and/or the output voltage can be adjusted. In other words, the frequency control for suppressing a ripple and the phase control for adjusting the output can be separated. This enables drive signals for the respective switching elements to be controlled with higher precision. In addition, as the duty ratio and the phase of the primary side drive signal are fixed, an increase in a circulating current in the primary side circuit can be suppressed.

In the electric power converter according to the embodiment of the present disclosure, for example, the bridge circuit may be a full bridge circuit that includes a first switching element disposed on a current path extending between one end of the capacitor and one end of the primary winding, a second switching element disposed on a current path extending between the one end of the capacitor and another end of the primary winding, a third switching element disposed on a current path extending between another end of the capacitor and the one end of the primary winding, and a fourth switching element disposed on a current path extending between the other end of the capacitor and the other end of the primary winding. The control device may turn on/off the first switching element at a fixed duty ratio and with a fixed phase, may turn on/off the fourth switching element at a duty ratio that is the same as a duty ratio of the first switching element and with a fixed phase that is different from a phase of the first switching element, may complementarily turn on/off the second switching element relative to the fourth switching element, and may complementarily turn on/off the third switching element relative to the first switching element.

As the duty ratio and the phase of the primary side drive signal are fixed, an increase in a circulating current in the primary side circuit can be suppressed.

In the electric power converter according to the embodiment of the present disclosure, for example, the secondary side rectifier circuit may include a first secondary side diode and a second secondary side diode. The first secondary side diode may be disposed on a current path extending between one end of the secondary winding and one end of the smoothing circuit or on a current path extending between another end of the secondary winding and another end of the smoothing circuit. The second secondary side diode may be disposed on a current path extending between the other end of the secondary winding and the one end of the smoothing circuit or on a current path extending between the one end of the secondary winding and the other end of the smoothing circuit.

The electric power converter according to the embodiment of the present disclosure may further include, for example, a primary side rectifier circuit that rectifies an inputted AC voltage to generate the first rectified voltage.

The electric power converter according to the embodiment of the present disclosure may, for example, be an apparatus that supplies electric power to a secondary battery, and the detected value may be a value of the capacitor voltage.

Embodiments

Hereinafter, embodiments will be described with reference to the drawings. It is to be noted that, in all of the drawings, identical or corresponding parts are given identical reference characters, and duplicate descriptions thereof may be omitted.

In addition, the embodiments described hereinafter illustrate comprehensive or specific examples. Numerical values, shapes, materials, components, arrangement of components, connection modes, waveforms, and so forth indicated in the embodiments hereinafter are examples, and are not intended to limit the present disclosure. Furthermore, among components described in the embodiments hereinafter, components that are not described in an independent claim expressing the broadest concept are described as optional components.

[Configuration of Electric Power Converter 100]

FIG. 1 illustrates a configuration example of an electric power converter 100 according to an embodiment. The electric power converter 100 is an AC-DC converter that converts an AC voltage to a DC voltage. Hereinafter, an example in which the electric power converter 100 is a charging apparatus will be described. The charging apparatus, for example, converts an AC voltage supplied from an AC source 30, or a commercial power source, to a DC voltage, and then outputs the DC voltage to a secondary battery 40.

The electric power converter 100 includes a switching power source apparatus 10, an output voltage detector 12, an output current detector 13, a capacitor voltage detector 14, a capacitor current detector 15, and a control device 20. The switching power source apparatus 10 is an isolation type AC-DC converter. The switching power source apparatus 10 includes a primary side rectifier circuit, a smoothing capacitor C0, an input resistance R1, a full bridge circuit, a transformer T, a secondary side rectifier circuit, a smoothing circuit, and an output resistance R2.

The primary side rectifier circuit rectifies full-waves of an AC voltage inputted from the AC source 30 so as to generate an input rectified voltage. The primary side rectifier circuit includes a first diode D1, a second diode D2, a third diode D3, and a fourth diode D4, all of which are in full bridge connection. The input rectified voltage is not a DC constant voltage but a DC voltage having a ripple. The smoothing capacitor C0 smooths the input rectified voltage from the primary side rectifier circuit so as to generate a smoother DC voltage.

The AC voltage inputted to the primary side rectifier circuit from the AC source 30 is an example of an "inputted AC voltage". The input rectified voltage generated by the primary side rectifier circuit is an example of a "first rectified voltage". In the present disclosure, a voltage outputted from the smoothing capacitor C0 may be referred to as a "capacitor voltage". A current outputted from the smoothing capacitor C0 may be referred to as a "capacitor current".

The input resistance R1 is interposed between an output terminal of the smoothing capacitor C0 and an input terminal of the full bridge circuit. The input resistance R1 is a current detector element for detecting the value of a current supplied to the full bridge circuit from the smoothing capacitor C0. A hall element may be used in place of the input resistance R1.

The full bridge circuit generates a primary side voltage from a DC voltage supplied from the smoothing capacitor C0. The full bridge circuit includes a first switching element S1, a second switching element S2, a third switching element S3, and a fourth switching element S4, all of which are in full bridge connection. Specifically, the full bridge circuit comprises a first arm and a second arm. The first arm includes the first switching element S1 disposed at an upper side and the third switching element S3 disposed at a lower side, and the second arm includes the second switching element S2 disposed at an upper side and the fourth switching element S4 disposed at a lower side. The first arm and the second arm are connected in parallel. The first switching element S1, the second switching element S2, the third switching element S3, and the fourth switching element S4 are switched on the basis of control signals from the control device 20. When the control device 20 successively switches a current path in the full bridge circuit, an output current from the smoothing capacitor C0 flows through the current path, thereby causing a forward current and a reverse current to be generated in an alternating manner.

Here, the bridge circuit may have a different configuration as long as a given circuit includes a plurality of switching elements and converts a capacitor voltage to the primary side AC voltage. In the example illustrated in FIG. 1, the "upper side" and the "lower side" correspond, respectively, to a high potential side and a low potential side when a voltage from the smoothing capacitor is applied to each of the arms.

In the example illustrated in FIG. 1, the full bridge circuit includes a first capacitor C1 connected in parallel to the first switching element S1, a second capacitor C2 connected in parallel to the second switching element S2, a third capacitor C3 connected in parallel to the third switching element S3, and a fourth capacitor C4 connected in parallel to the fourth switching element S4. In the example illustrated in FIG. 1, the full bridge circuit includes a first reverse conducting diode Ds1 connected in parallel to the first switching element S1, a second reverse conducting diode Ds2 connected in parallel to the second switching element S2, a third reverse conducting diode Ds3 connected in parallel to the third switching element S3, and a fourth reverse conducting diode Ds4 connected in parallel to the fourth switching element S4.

The first reverse conducting diode Ds1 to the fourth reverse conducting diode Ds4 are connected in reverse bias to the first switching element S1 to the fourth switching element S4, respectively. In other words, the first reverse conducting diode Ds1 to the fourth reverse conducting diode Ds4 are each connected in such a manner that a cathode is located at an upper side and an anode is located at a lower side. The first reverse conducting diode Ds1 to the fourth reverse conducting diode Ds4 may, for example, be parasitic diodes of the first switching element S1 to the fourth switching element S4.

The first capacitor C1 to the fourth capacitor C4 may be snubber capacitors.

The first switching element S1 to the fourth switching element S4 may, for example, be semiconductor switching elements, such as MOSFETs or IGBTs. In the example illustrated in FIG. 1, the first switching element S1 to the fourth switching element S4 are n-channel MOSFETs. Alternatively, the first switching element S1 and the second switching element S2 may be p-channel MOSFETs, and the third switching element S3 and the fourth switching element S4 may be n-channel MOSFETs.

The transformer T is a high-frequency transformer that includes a primary winding N1 and a secondary winding N2. The primary winding N1 and the secondary winding N2 are coupled through electromagnetic induction. The primary side and the secondary side are insulated from each other. The transformer T transforms an AC voltage in accordance with the turns ratio of the primary winding N1 to the secondary winding N2. In FIG. 1, the transformer T transforms the primary side voltage to a secondary side voltage. The two ends of the primary winding N1 are connected to the respective two output ends of the full bridge circuit, and the two ends of the secondary winding N2 are connected to the respective two input ends of the secondary side rectifier circuit.

In the example illustrated in FIG. 1, one end of the primary winding N1 of the transformer T is connected to the first arm, and the other end of the primary winding N1 is connected to the second arm. Hereinafter, for simplifying the description, the direction from the one end toward the other end of the primary winding N1 may be referred to as a "forward direction", and the current flowing in the forward direction may be referred to as a "forward current". The direction from the other end to the one end of the primary winding N1 may be referred to as a "reverse direction", and the current flowing in the reverse direction may be referred to as a "reverse current". In the example illustrated in FIG. 1, one end of the secondary winding N2 of the transformer T is connected to a node between a seventh diode D7 and an eighth diode D8, and the other end of the secondary winding N2 is connected to a node between a fifth diode D5 and a sixth diode D6. The direction from the one end toward the other end of the secondary winding N2 may be referred to as the "forward direction", and the current flowing in the forward direction may be referred to as the "forward current". The direction from the other end to the one end of the secondary winding N2 may be referred to as the "reverse direction", and the current flowing in the reverse direction may be referred to as the "reverse current".

A forward current flows through the transformer T when the first switching element S1 and the fourth switching element S4 are in an on state and the second switching element S2 and the third switching element S3 are in an off state. A reverse current flows through the transformer T when the second switching element S2 and the third switching element S3 are in an on state and the first switching element S1 and the fourth switching element S4 are in an off state. The first switching element S1 and the fourth switching element S4 are disposed on a path through which a forward current is supplied to the primary winding N1. In other words, the first switching element S1 and the fourth switching element S4 function as primary side forward direction switching elements. The second switching element S2 and the third switching element S3 are disposed on a path through which a reverse current is supplied to the primary winding N1. In other words, the second switching element S2 and the third switching element S3 function as primary side reverse direction switching elements.

The secondary side rectifier circuit rectifies full-waves of the secondary side voltage inputted from the secondary winding N2 so as to generate a rectified voltage. The secondary side rectifier circuit includes the fifth diode D5, the sixth diode D6, the seventh diode D7, and the eighth diode D8, all of which are in full bridge connection. The fifth diode D5 and the eighth diode D8 conduct a forward current from the secondary winding N2 and cut off a reverse current from the secondary winding N2. The sixth diode D6 and the seventh diode D7 cut off a forward current from the secondary winding N2 and conduct a reverse current from the secondary winding N2. With this configuration, the secondary side rectifier circuit rectifies full-waves of an AC voltage supplied from the secondary winding N2.

The smoothing circuit smooths a rectified voltage outputted from the secondary side rectifier circuit so as to generate an output voltage for charging the secondary battery 40. In the example illustrated in FIG. 1, the smoothing circuit is formed by an LC filter that includes a first coil L1 and a fifth capacitor C5. Here, the smoothing circuit may have a different configuration.

The sixth diode D6 and the seventh diode D7 are each an example of a "first secondary side diode". The fifth diode D5 and the eighth diode D8 are each an example of a "second secondary side diode". The rectified voltage generated by the secondary side rectifier circuit is an example of a "second rectified voltage". The fifth capacitor C5 is an example of a "secondary side capacitor". A parasitic inductor may be used in place of the first coil L1.

The output resistance R2 is connected to an output terminal of the secondary side rectifier circuit. The output resistance R2 is a current detector element for detecting the value of a current supplied to the secondary battery 40 from the smoothing circuit. A hall element may be used in place of the output resistance R2.

The output voltage detector 12 detects an output voltage outputted to the secondary battery 40 from the switching power source apparatus 10. The output voltage detector 12 may, for example, be an error amplifier that receives an output voltage of the switching power source apparatus 10 as an input. The output voltage detector 12 outputs a detected output voltage value to the control device 20. The output voltage detector 12 may detect an output voltage value itself or may detect another physical quantity that can reflect a variation in an output voltage value.

The output current detector 13 detects an output current outputted to the secondary battery 40 from the switching power source apparatus 10. The output current detector 13 may, for example, be an error amplifier that receives a voltage across the two ends of the output resistance R2 as an input. The output current detector 13 outputs a detected output current value to the control device 20. The output current detector 13 may detect an output current value itself or may detect another physical quantity that can reflect a variation in an output current value.

Each of the output voltage detector 12 and the output current detector 13 is an example of an "output detector". The output detector may include at least one of the output voltage detector 12 and the output current detector 13.

The capacitor voltage detector 14 detects a capacitor voltage of the smoothing capacitor C0. The capacitor voltage detector 14 may, for example, be an error amplifier that receives a voltage across the two ends of the smoothing capacitor C0 as an input. The capacitor voltage detector 14 outputs a detected voltage value to the control device 20. The capacitor voltage detector 14 may detect a capacitor voltage itself or may detect another physical quantity that can reflect a variation in a capacitor voltage.

The capacitor current detector 15 detects a capacitor current from the smoothing capacitor C0. The capacitor current detector 15 may, for example, be an error amplifier that receives a voltage across the two ends of the input resistance R1 as an input. The capacitor current detector 15 outputs a detected current value to the control device 20. The capacitor current detector 15 may detect a capacitor current itself or may detect another physical quantity that can reflect a variation in a capacitor current.

Each of the capacitor voltage detector 14 and the capacitor current detector 15 is an example of a "detector". The detector may include at least one of the capacitor voltage detector 14 and the capacitor current detector 15.

The control device 20 controls on/off of the first switching element S1 to the fourth switching element S4 so as to drive the switching power source apparatus 10. The control device 20 adaptively varies the switching frequencies of the first switching element S1 to the fourth switching element S4 in accordance with a value based on at least one of the capacitor voltage and the capacitor current of the smoothing capacitor C0. Hereinafter, a method for controlling the full bridge circuit will be described specifically.

[Method for Controlling Bridge Circuit]

The control device 20 outputs primary side drive signals for turning on/off the first switching element S1 to the fourth switching element S4. Of the primary side drive signals, for example, a drive signal for the first switching element S1 and a drive signal for the third switching element S3 are complementary signals in which when one of the drive signals is at a high level, the other drive signal is at a low level, and when one of the drive signals is at a low level, the other drive signal is at a high level. In a similar manner, a drive signal for the second switching element S2 and a drive signal for the fourth switching element S4 are complementary signals in which when one of the drive signals is at a high level, the other drive signal is at a low level, and when one of the drive signals is at a low level, the other drive signal is at a high level. It is to be noted that examples of "complementary signals" in the present disclosure also include signals that are complementary excluding a dead time. The drive signal for the first switching element S1 and the drive signal for the fourth switching element S4, for example, have the same duty ratio but have different phases. The duty ratios and the phases of the drive signals for the first switching element S1 to the fourth switching element S4 take, for example, predetermined fixed values. In this case, the phase difference between the first switching element S1 and the fourth switching element S4 takes a fixed value as well.

A switching frequency for turning on/off each of the first switching element S1 to the fourth switching element S4 is set in accordance with a detected value of the detector.

The detected value may be a voltage value supplied from the capacitor voltage detector 14, may be a current value supplied from the capacitor current detector 15, or may be an electric power value derived by multiplying the voltage value and the current value. The detected value may be another physical quantity that can reflect a variation of at least one of the voltage, the current, and the electric power outputted from the smoothing capacitor C0. The detected value may, for example, be a value that increases along with an increase of at least one of the voltage, the current, and the electric power outputted from the smoothing capacitor C0.

In a case in which the voltage value is used as the detected value, the input resistance R1 and the capacitor current detector 15 may be omitted.

In a case in which the current value is used as the detected value, a ripple in the output current can be reduced more directly. Therefore, in a case in which the load is the secondary battery 40 as illustrated in FIG. 1, a stable constant current output can be realized. In a case in which the current value is used as the detected value, the capacitor voltage detector 14 may be omitted.

In a case in which the electric power value is used as the detected value, an input electric power value can be also used for other purposes. For example, in a case in which input electric power of the electric power converter 100 is managed by an external energy monitoring system, a calculation unit (not illustrated) for calculating the input electric power may be shared therebetween.

The control device 20 obtains the detected value and sets the switching frequency in accordance with the magnitude of the detected value. The control device 20 sets a higher switching frequency in a case in which the detected value is greater and sets a lower switching frequency in a case in which the detected value is smaller. In other words, the control device 20 increases the switching frequency as the detected value increases and reduces the switching frequency as the detected value decreases. Here, the switching frequency may be increased continuously as the detected value increases or may be increased stepwise each time the detected value exceeds a predetermined value.

The control device 20 may determine the magnitude of the detected value by comparing the detected value with a plurality of reference values, and then may determine the switching frequency in accordance with the result of the determination. In that case, the reference values may be preset values.

The control device 20 may compare a newly detected value with a previously detected value, and then may determine the switching frequency in accordance with the result of the comparison.

The control device 20 may input the detected value into a calculation circuit to determine the switching frequency.

The control device 20 controls the switching frequency of the first switching element S1 to the fourth switching element S4 in synchronization with a ripple in the voltage value, the current value, or the electric power value of the smoothing capacitor C0. For example, the amplitude of the switching frequency is in proportion to the magnitude of a ripple in the voltage value, the current value, or the electric power value of the smoothing capacitor C0. The control device 20 may vary the amplitude of the frequency, for example, with the center frequency of 20 kHz.

[Reduction of Ripple]

Hereinafter, a case in which the electric power converter 100 illustrated in FIG. 1 is driven at a constant switching frequency and a case in which the electric power converter 100 is driven with the switching frequency being varied will be compared. It is to be noted that the latter case corresponds to an example of the present embodiment.

Figure 2A:
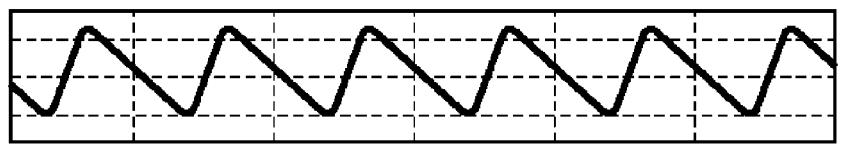
FIGS. 2A to 2E illustrate examples of signal waveforms in an electric power converter when driving the switching power source apparatus at a constant switching frequency.
Figure 2B:
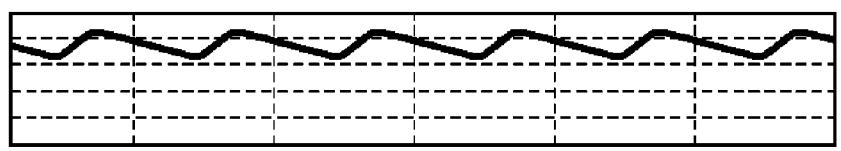
Figure 2C:
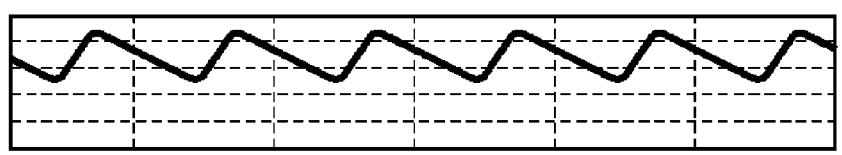
Figure 2D:
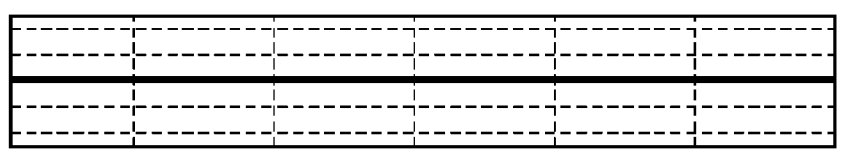
Figure 2E:
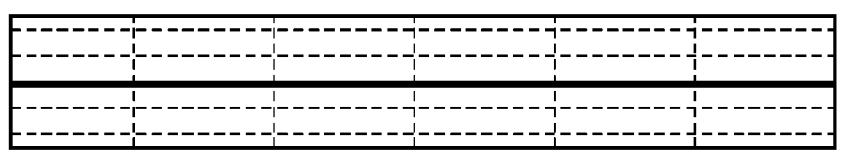

FIGS. 2A to 2E schematically illustrate examples of signal waveforms in the electric power converter 100 when driving the switching power source apparatus 10 at a constant switching frequency. FIG. 2A illustrates the voltage of the smoothing capacitor C0. FIG. 2B illustrates the output voltage of the electric power converter 100. FIG. 2C illustrates the output current of the electric power converter 100. FIG. 2D illustrates the switching frequency of the first switching element S1 to the fourth switching element S4. FIG. 2E illustrates the control phase amount of the first switching element S1 to the fourth switching element S4.

A ripple in the input rectified voltage from the primary side rectifier circuit is reduced by the smoothing capacitor C0. As illustrated in FIGS. 2B and 2C, however, a ripple in the input rectified voltage is not removed completely, and propagates to the output voltage and the output current of the electric power converter 100. In other words, the ripple in the input rectified voltage generates ripples in the output voltage and current. In a case in which the electric power converter 100 supplies the output electric power to the secondary battery, the ripples in the output voltage and current prevent the secondary battery 40 from charging with a constant current and/or with a constant voltage. As the secondary battery 40 is charged with a current that includes a large ripple, the secondary battery 40 deteriorates more easily.

Figure 3A:
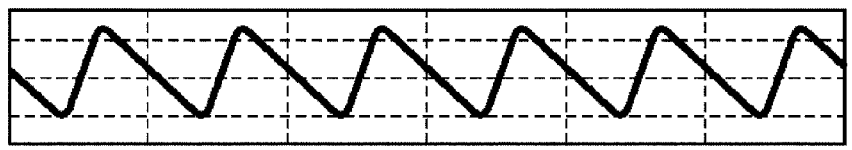
FIGS. 3A to 3E illustrate examples of signal waveforms in the electric power converter according to the embodiment.
Figure 3B:
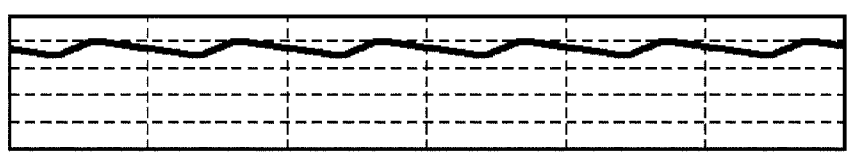
Figure 3C:
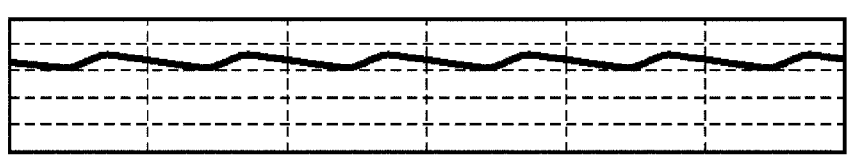
Figure 3D:
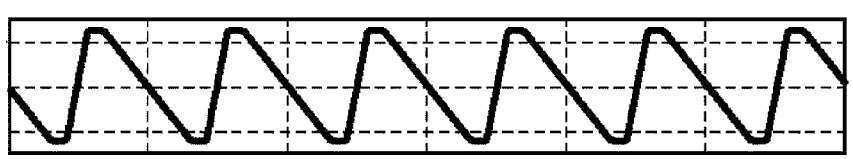
Figure 3E:
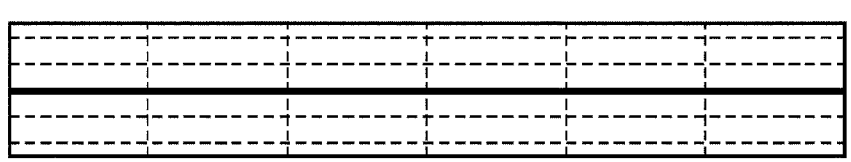

FIGS. 3A to 3E schematically illustrate examples of signal waveforms in the electric power converter 100 when driving the switching power source apparatus 10 at a switching frequency that is varied in accordance with a detected value. FIG. 3A illustrates the voltage of the smoothing capacitor C0. FIG. 3B illustrates the output voltage of the electric power converter 100. FIG. 3C illustrates the output current of the electric power converter 100. FIG. 3D illustrates the control frequency of the first switching element S1 to the fourth switching element S4. FIG. 3E illustrates the control phase amount of the first switching element S1 to the fourth switching element S4.

As illustrated in FIGS. 3A and 3D, the control frequency is reduced when the voltage of the smoothing capacitor C0 is high, and the control frequency is increased when the voltage of the smoothing capacitor C0 is low. This enables the ripples included in the output voltage and current of the electric power converter 100 to be greatly reduced. As can be seen by comparing FIGS. 2B and 3B and by comparing FIGS. 2C and 3C, the effect of reducing a ripple when changing the switching frequency is greater than the effect when keeping the switching frequency constant. This is explained as follows. When the frequencies of the AC voltage and the AC current inputted to the transformer T change, the impedance of the secondary side circuit changes. As the impedance of the secondary side circuit changes, the electric power drawn from the primary winding N1 of the transformer T to the secondary winding N2 changes. In the present embodiment, the secondary side circuit is designed in such a manner that a current flows more easily as the frequency of the AC current inputted to the primary winding N1 of the transformer T is lower and a current flows less easily as the frequency of the AC current inputted to the primary winding N1 of the transformer T is higher. For example, the coil and the capacitor in the secondary side circuit may be selected so that the impedance of the secondary side circuit increases in accordance with an increase in the frequency of the AC voltage inputted thereinto. Thus, as the switching frequency of the drive signals for the first switching element S1 to the fourth switching element S4 increases, the frequencies of the AC voltage and the AC current inputted to the primary winding N1 of the transformer T increase, and thereby the electric power drawn from the primary winding N1 of the transformer T to the secondary winding N2 decreases. This causes the output voltage and the output current of the electric power converter 100 to be decreased. As a result, the decrement of the outputs caused by increasing the switching frequency can cancel at least part of the increment of the outputs due to the ripples. Similarly, the increment of the outputs caused by decreasing the switching frequency can cancel at least part of the decrement of the outputs due to the ripples.

[Suppression of Circulating Current]

Figure 4:
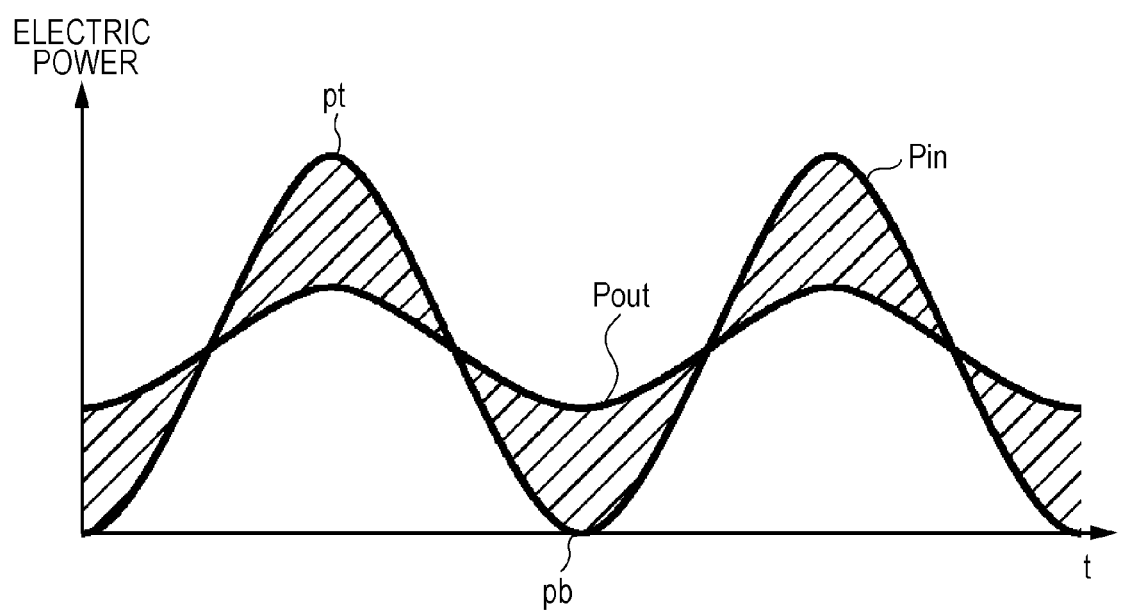
FIG. 4 illustrates examples of input electric power Pin and output electric power Pout in the electric power converter.

FIG. 4 illustrates examples of input electric power Pin and output electric power Pout in the electric power converter 100. The input electric power Pin includes an AC component, and the AC component includes a peak top pt and a peak bottom pb.

Figure 5A:
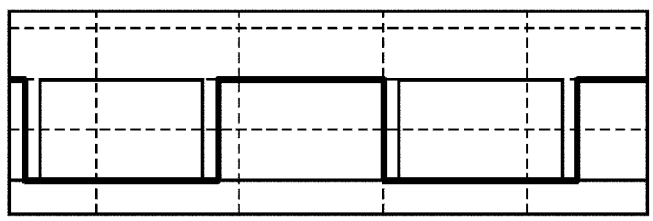
FIGS. 5A to 5D illustrate examples of signal waveforms around a peak bottom pb in the electric power converter according to the embodiment.
Figure 5B:
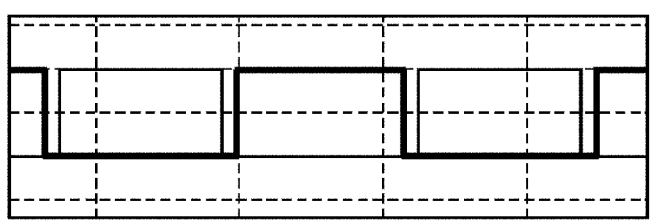
Figure 5C:
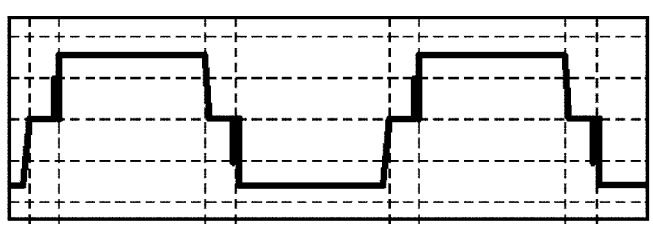
Figure 5D:
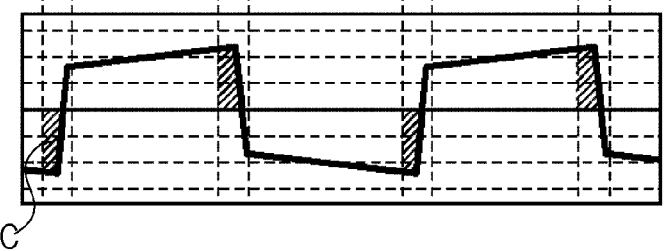

FIGS. 5A to 5D illustrate signal waveforms when the input electric power Pin around the peak bottom pb is inputted to the electric power converter 100. FIG. 5A illustrates the drive signal for the first switching element S1 and the drive signal for the third switching element S3. FIG. 5B illustrates the drive signal for the second switching element S2 and the drive signal for the fourth switching element S4. FIG. 5C illustrates the transformer voltage. FIG. 5D illustrates the transformer current. The transformer voltage illustrated in FIG. 5C and the transformer current illustrated in FIG. 5D are, respectively, the voltage and the current of the primary winding N1 of the transformer T. In FIG. 5A, the drive signal for the first switching element S1 (thin line in FIG. 5A) and the drive signal for the third switching element S3 (thick line in FIG. 5A) are complementary signals excluding the dead time. In FIG. 5B, the drive signal for the second switching element S2 (thick line in FIG. 5B) and the drive signal for the fourth switching element S4 (thin line in FIG. 5B) are complementary signals excluding the dead time.

Figure 6A:
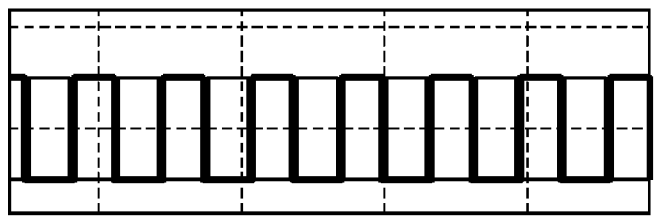
FIGS. 6A to 6D illustrate examples of signal waveforms around a peak top pt in the electric power converter according to the embodiment.
Figure 6B:
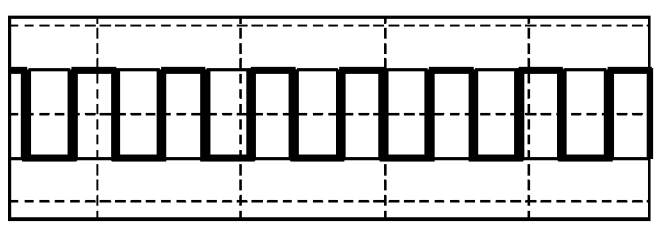
Figure 6C:
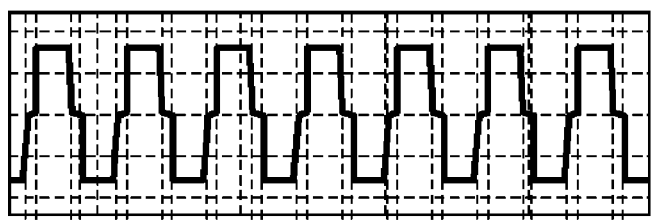
Figure 6D:
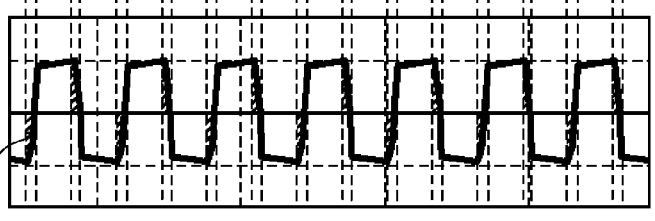

FIGS. 6A to 6D illustrate signal waveforms when the input electric power Pin around the peak top pt is inputted to the electric power converter 100. FIG. 6A illustrates the drive signal for the first switching element S1 and the drive signal for the third switching element S3. FIG. 6B illustrates the drive signal for the second switching element S2 and the drive signal for the fourth switching element S4. FIG. 6C illustrates the transformer voltage. FIG. 6D illustrates the transformer current. The transformer voltage illustrated in FIG. 6C and the transformer current illustrated in FIG. 6D are, respectively, the voltage and the current of the primary winding N1 of the transformer T. In FIG. 6A, the drive signal for the first switching element S1 (thin line in FIG. 6A) and the drive signal for the third switching element S3 (thick line in FIG. 6A) are complementary signals excluding the dead time. In FIG. 6B, the drive signal for the second switching element S2 (thick line in FIG. 6B) and the drive signal for the fourth switching element S4 (thin line in FIG. 6B) are complementary signals excluding the dead time. The switching frequency of each of the drive signals illustrated in FIGS. 6A and 6B is higher than the switching frequency of each of the drive signals illustrated in FIGS. 5A and 5B.

When there is no potential difference between the two ends of the primary winding N1, electromagnetic induction from the primary winding N1 to the secondary winding N2 is not occurred. Thus, in this state, a current generated through a leakage flux from the primary winding N1 circulates in the primary side circuit. In FIG. 5D and FIG. 6D, a circulating current CC flowing in the primary side is indicated by hatching. As the circulating current CC flows, a loss may occur due to a wiring loss, for example.

As the phase difference between the drive signal for the first switching element S1 and the drive signal for the fourth switching element S4 increases, a period in which there is no potential difference between the two ends of the primary winding N1 of the transformer T increases. Thus, as the phase difference increases, a larger amount of circulating current flows through the primary side circuit, and thereby the loss increases. Accordingly, a conventional method for reducing a ripple by varying the phase difference can reduce the ripple, but may increase a loss caused by a circulating current as the phase difference is increased. Another conventional method for reducing a ripple by varying the duty ratio may also increase a loss caused by a circulating current as off-periods of the first switching element S1 to the fourth switching element S4 is extended.

On the other hand, with the controlling method according to the present embodiment, even when the electric power drawn from the primary winding N1 to the secondary winding N2 decreases, a period in which there is no potential difference between the two ends of the primary winding N1 is not extended. In other words, even if the level of the frequency is changed, the flowing rate of the circulating current CC does not change.

In this manner, the ripple suppression method according to the present embodiment can reduce a loss caused by a circulating current, as compared to the conventional methods. Specifically, a circulating current CC around the peak top pt can be greatly reduced as compared to the conventional ripple suppression methods. Accordingly, the conversion efficiency of the electric power converter 100 can greatly improve. In other words, the electric power converter 100 according to the present embodiment can suppress a ripple while suppressing a loss caused by a circulating current. Thus, the electric power converter 100 can, for example, charge the secondary battery 40 with a constant current and with a constant voltage.

In addition, electric power converter 100 according to the present embodiment makes it possible to improve the efficiency, to reduce the size, and to reduce the cost, as compared to a method in which a greater amount of ripple is reduced by increasing the capacity of the smoothing capacitor C0.

Modified Examples

The control device 20 may carry out feedback control on the basis of an output value from the output voltage detector 12 and/or the output current detector 13. This enables the output voltage and/or the output current to be controlled, and thereby constant voltage output and constant current output may be achieved. A duty method or a secondary-side phase shift method may, for example, be used as the output control method. The output control can be used concomitantly with the switching frequency control for suppressing ripples. The secondary-side phase shift method enables the switching frequency control and the output control to be carried out in the primary side and in the secondary side, respectively.

[Configuration of Electric Power Converter 100a]

Figure 7:
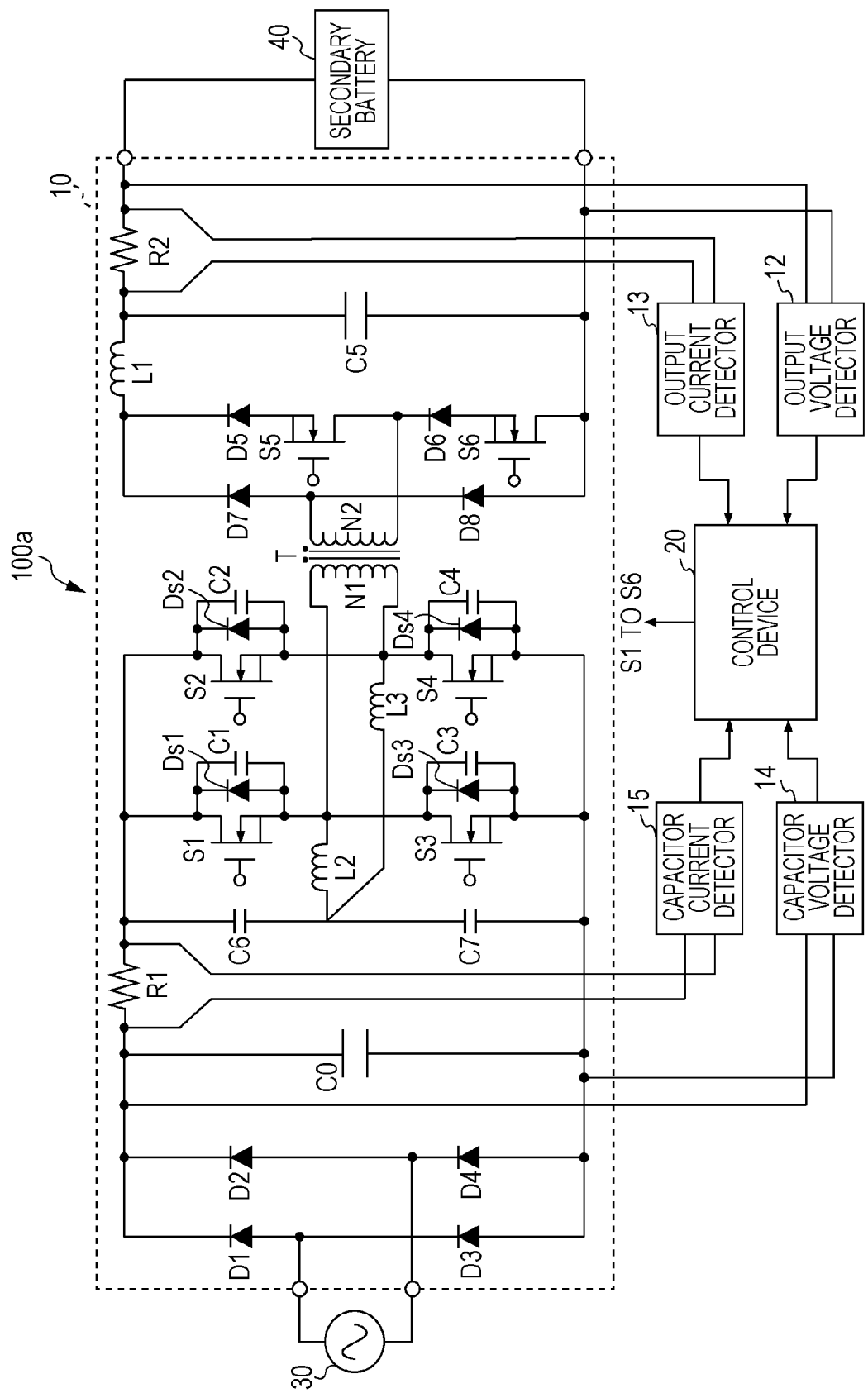
FIG. 7 illustrates a configuration example of an electric power converter according to a modified example of the embodiment.

FIG. 7 illustrates a configuration example of an electric power converter 100a according to a modified example. Hereinafter, part of the electric power converter 100a that differs from the electric power converter 100 illustrated in FIG. 1 will be described. The electric power converter 100a according to the modified example illustrated in FIG. 7 is an isolation type AC-DC converter that employs the secondary-side phase shift method.

A bridge circuit of the electric power converter 100a is a partial resonance type full bridge circuit. The partial resonance type full bridge circuit illustrated in FIG. 7 includes, in addition to the configuration of the full bridge circuit illustrated in FIG. 1, a second coil L2, a third coil L3, a sixth capacitor C6, and a seventh capacitor C7. The partial resonance type full bridge circuit carries out resonant commutation only at switching and operates non-resonantly in other modes. The full bridge circuit illustrated in FIG. 7 has a resonance pole type configuration that can guarantee zero voltage commutation even with a light load.

The sixth capacitor C6 and the seventh capacitor C7 are connected in series, and this series circuit is connected between input terminals of the full bridge circuit. The second coil L2 is connected between a node between the sixth capacitor C6 and the seventh capacitor C7 and a node between the first switching element S1 and the third switching element S3. The third coil L3 is connected between the node between the sixth capacitor C6 and the seventh capacitor C7 and a node between the second switching element S2 and the fourth switching element S4. In the resonance pole type full bridge circuit illustrated in FIG. 7, the sixth capacitor C6 and the seventh capacitor C7 are shared by the second coil L2 and the third coil L3. Alternatively, a capacitor for the third coil L3 may be provided separately from the sixth capacitor C6 and the seventh capacitor C7.

The second coil L2 and the third coil L3 are auxiliary inductors for resonance, and currents are supplied thereto from the sixth capacitor C6 and the seventh capacitor C7. In order to carry out zero voltage switching of a switching element, an electric charge in a capacitor connected in parallel to the switching element needs to be zero at the time of switching the switching element. Since the resonance pole type full bridge circuit illustrated in FIG. 7 includes the second coil L2 and the third coil L3, a capacitor can be fully discharged during a partial resonance period, even when a load current is reduced with a light load. Therefore, in the resonance pole type full bridge circuit illustrated in FIG. 7, the first switching element S1 to the fourth switching element S4 can reliably be subjected to zero voltage switching.

A secondary side rectifier circuit of the electric power converter 100a includes a fifth switching element S5 and a sixth switching element S6, in addition to the fifth diode D5, the sixth diode D6, the seventh diode D7, and the eighth diode D8. The fifth switching element S5 and the sixth switching element S6 are each disposed on a current path in the secondary side rectifier circuit. Specifically, the fifth switching element S5 is disposed on a forward current path that includes the fifth diode D5 and the eighth diode D8. In other words, the fifth switching element S5 functions as a secondary side forward direction switching element. The sixth switching element S6 is disposed on a reverse current path that includes the sixth diode D6 and the seventh diode D7. In other words, the sixth switching element S6 functions as a secondary side reverse direction switching element.

As the fifth switching element S5 and the sixth switching element S6 are switched, the electric power drawn from the transformer T is adjusted. The fifth switching element S5 and the sixth switching element S6 may, for example, be semiconductor switching elements, such as MOSFETs or IGBTs.

The fifth switching element S5 is an example of a "first secondary side switching element". The sixth switching element S6 is an example of a "second secondary side switching element".

The control device 20 controls on/off of the first switching element S1 to the sixth switching element S6 so as to drive the switching power source apparatus 10.

Of a period in which a forward current flows through the transformer T, during a period in which the fifth switching element S5 is controlled to be in an on state, a forward current flows through the secondary side rectifier circuit. During the period in which the forward current flows, the fifth diode D5 and the eighth diode D8 are in a conducting state; the sixth diode D6 and the seventh diode D7 are in a non-conducting state; the fifth switching element S5 is in an on state; and the sixth switching element S6 is in an off state.

Of a period in which a reverse current flows through the transformer T, during a period in which the sixth switching element S6 is controlled to be in an on state, a reverse current flows through the secondary side rectifier circuit. During the period in which the reverse current flows, the sixth diode D6 and the seventh diode D7 are in a conducting state; the fifth diode D5 and the eighth diode D8 are in a non-conducting state; the sixth switching element S6 is in an on state; and the fifth switching element S5 is in an off state.

The control device 20 adaptively varies the control phases of the fifth switching element S5 and the sixth switching element S6 in accordance with a current value supplied from the output current detector 13 and/or a voltage value supplied from the output voltage detector 12.

[Controlling Method in Modified Example]

The control device 20 supplies primary side drive signals to the control terminals of the first switching element S1 to the fourth switching element S4 and supplies secondary side drive signals to the control terminals of the fifth switching element S5 and the sixth switching element S6.

The primary side drive signals drive the first switching element S1 to the fourth switching element S4 at fixed duty ratios and with fixed phases. Specifically, the first switching element S1 and the third switching element S3 are driven complementarily at a duty ratio of 50% excluding the dead time, and the second switching element S2 and the fourth switching element S4 are driven complementarily at a duty ratio of 50% excluding the dead time. In the present modified example, the output current or the output voltage is adjusted with the secondary side switching elements are controlled, and thus the duty ratios and the control phases of the first switching element S1 to the fourth switching element S4 are fixed. However, in order to suppress a ripple, the switching frequency of the first switching element S1 to the fourth switching element S4 are varied by the control device 20 in a manner similar to the one described above.

The primary side drive signals include a dead time between a period in which a forward current flows through the primary winding N1 of the transformer T and a period in which a reverse current flows therethrough. During the dead time, the first switching element S1 and the second switching element S2 are in an off state, or the third switching element S3 and the fourth switching element S4 are in an off state. During the dead time, a resonant current flows between a capacitance component and an inductance component, and thereby a capacitor connected in parallel to a next switching element to be turned on is discharged.

The secondary side drive signals drive the fifth switching element S5 and the sixth switching element S6 at fixed duty ratios and with variable phases. For example, the fifth switching element S5 and the sixth switching element S6 are driven complementarily at a duty ratio of 50%.

The control device 20 varies the phases of the fifth switching element S5 and the sixth switching element S6. Specifically, the control device 20 adaptively shifts the phases of the fifth switching element S5 and the sixth switching element S6 in accordance with the output current or the output voltage of the switching power source apparatus 10. Therefore, the control device 20 varies a phase difference between the phases of the first switching element S1 to the fourth switching element S4 and the phases of the fifth switching element S5 and the sixth switching element S6. This phase difference corresponds, for example, to an amount of a delay in the variable phases of the fifth switching element S5 and the sixth switching element S6 relative to the fixed phases of the first switching element S1 to the fourth switching element S4. This enables the output current or the output voltage of the switching power source apparatus 10 to be stabilized.

For example, when the output current or the output voltage of the switching power source apparatus 10 increases, the control device 20, for example, delays the phases of the fifth switching element S5 and the sixth switching element S6 so as to increase the phase difference. This causes the electric power drawn from the transformer T to be decreased. On the other hand, when the output current or the output voltage of the switching power source apparatus 10 decreases, the control device 20, for example, brings the phases of the fifth switching element S5 and the sixth switching element S6 forward so as to reduce the phase difference. This causes the electric power drawn from the transformer T to be increased. When the phase difference is zero, the amount of electric power drawn from the transformer T maximizes. As the phase difference increases, the electric power drawn from the transformer T decreases.

[Achieving Both Ripple Suppression and Output Adjustment]

According to the present modified example, as the frequencies of the primary side drive signals are variably controlled, a ripple can be suppressed. In addition, as the phases of the secondary side drive signals are variably controlled, the output current and/or the output voltage can be adjusted. In other words, the frequency control for suppressing a ripple and the phase control for adjusting the output can be separated. This enables the drive signals for the respective switching elements to be controlled with higher precision. Here, as the switching frequencies of the primary side drive signals vary, the switching frequencies of the secondary side drive signals may vary accordingly. Even in such a case, the frequencies of the primary side drive signals can be controlled so as not to be affected by the phase control of the secondary side drive signals.

In the present modified example, the phases of the primary side drive signals are fixed, and thus a phase difference among the plurality of switching elements in the bridge circuit is fixed. Thus, as described above, an increase in a circulating current in the primary side circuit can be suppressed. In other words, with the secondary-side phase shift method, the output current and/or the output voltage can be adjusted without increasing the circulating current in the primary side circuit.

The present modified example employs the secondary-side phase shift method, and thus the plurality of switching elements in the bridge circuit may undergo soft switching. For example, the plurality of switching elements in the bridge circuit may undergo zero voltage switching (ZVS) or zero current switching (ZCS). Thus, a switching loss can be reduced, and electromagnetic induction noise can be reduced.

In addition, a current path extending between the secondary side switching elements and the load is shorter than a current path extending between the primary side switching elements and the load. Thus, the modified example that employs the control through the secondary-side phase shift method can reduce a wiring loss and improve the efficiency as compared to the case in which the control is carried out through the primary-side phase shift method.

Application Example

The electric power converters described above can be used for various purposes. Hereinafter, an example in which an electric power converter described above is used as an in-vehicle charger will be described. The electric power converters according to the present embodiment may be used in quick chargers or contactless chargers installed outside vehicles, chargers for household batteries, AC-DC connection devices for energy monitoring systems, for example. The electric power converters according to the present embodiment may be used for charging secondary batteries with commercial power sources.

Figure 8:
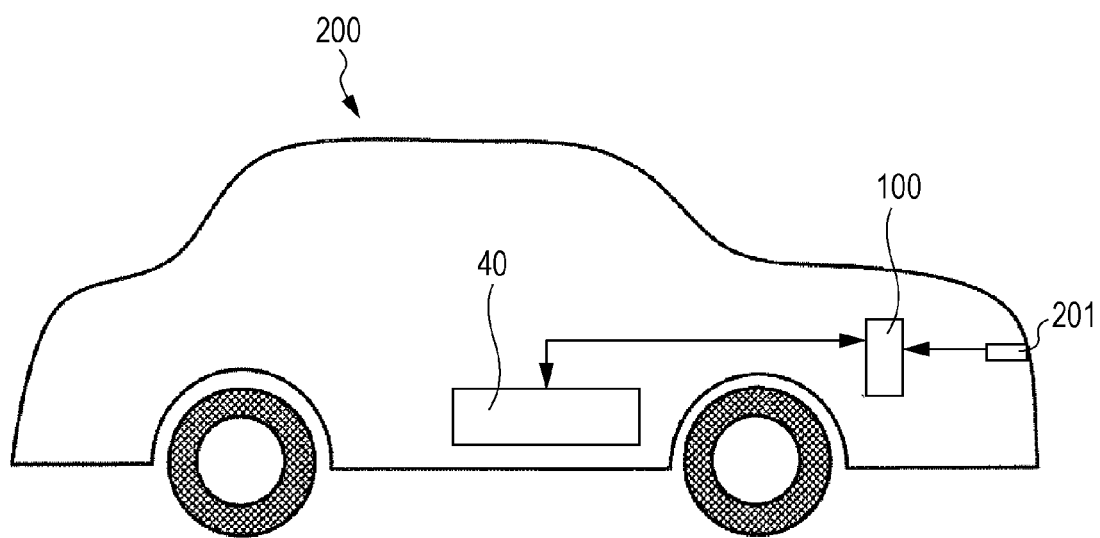
FIG. 8 is a block diagram illustrating a configuration example of a vehicle provided with the electric power converter according to the embodiment.

FIG. 8 is a block diagram illustrating a configuration example of a vehicle 200 in which the electric power converter 100 or 100a according to the present embodiment is provided. The vehicle 200, for example, is an electric vehicle or a plug-in hybrid vehicle. The vehicle 200 is provided with an outlet 201 for connecting to an external commercial power source, a charger constituted by the electric power converter 100 or 100a according to the present embodiment, and the secondary battery 40. AC electric power supplied through the outlet 201 is converted to DC electric power through the charger, and the secondary battery 40 is charged with the DC electric power. As the electric power converter 100 or 100a according to the present embodiment is used in the charger, stress on the secondary battery 40 caused by a ripple can be reduced, and high-efficient charging becomes possible.

The descriptions given thus far are illustrative, and it is appreciated by a person skilled in the art that various modifications can be made to the combinations of the components and the processing processes described above and that such modifications also fall within the scope of the present disclosure.

For example, a power factor improvement circuit (PFC circuit) may be provided between the primary side rectifier circuit and the smoothing capacitor C0. The PFC circuit may be of an interleave type.

For example, in a case in which the electric power converter is driven through the secondary-side phase shift method, the primary side bridge circuit may be a half bridge circuit, instead of the full bridge circuit. The secondary side rectifier circuit may be of a center tap type, instead of a full bridge type.

The load is not limited to the secondary battery. The load may, for example, be an information processing device. The electric power converter according to the present embodiment is a high-efficient AC-DC converter, and thus can also be applied to a data center where a large number of servers are installed.

In addition, the electric power converter is not limited to an isolation type AC-DC converter. The frequency control of the switching elements according to the present disclosure can, for example, be applied to a non-isolation type AC-DC converter as well. For example, the frequency control of the switching elements according to the present disclosure may be applied to a three-terminal regulator, a step-up chopper, or a step-down chopper.

The present disclosure can, for example, be used in an AC-DC converter that is used in a charger.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. An electric power converter, comprising:
a capacitor that smooths a first rectified voltage to generate a capacitor voltage;
a bridge circuit that converts the capacitor voltage to a primary side AC voltage, the bridge circuit including a plurality of switching elements;
a current detection resistance disposed between the capacitor and the bridge circuit;
a transformer that converts the primary side AC voltage to a secondary side AC voltage, the transformer including a primary winding connected to the bridge circuit and a secondary winding electromagnetically coupled to the primary winding;
a secondary side rectifier circuit that rectifies the secondary side AC voltage to generate a second rectified voltage, the secondary side rectifier circuit being connected to the secondary winding;
a smoothing circuit that smooths the second rectified voltage;
a detector that detects a value based on at least a capacitor current which flows from the capacitor to the bridge circuit through the current detection resistance; and
a controller that outputs a primary side drive signal to turn on/off each of the plurality of switching elements at a switching frequency, the controller increasing the switching frequency when the detected value increases, the controller reducing the switching frequency when the detected value decreases.

2. The electric power converter according to claim 1, further comprising:
a secondary side switching circuit that turns on/off electrical conduction between the secondary winding and the smoothing circuit, the secondary side switching circuit including a plurality of secondary side switching elements; and
an output detector that detects an output value based on at least one of an output voltage and an output current from the smoothing circuit,
wherein the smoothing circuit includes
a secondary side capacitor, and
a coil disposed on a current path extending between the secondary side capacitor and the secondary side rectifier circuit, and
wherein the controller further
determines a phase difference between the primary side drive signal and a secondary side drive signal on the basis of the output value, and
outputs the secondary side drive signal to turn on/off each of the plurality of secondary side switching elements with a phase in accordance with the phase difference.

3. The electric power converter according to claim 2, wherein the secondary side switching circuit includes
a first secondary side switching element disposed on a current path extending between one end of the secondary winding and one end of the smoothing circuit or on a current path extending between another end of the secondary winding and another end of the smoothing circuit, and
a second secondary side switching element disposed on a current path extending between the other end of the secondary winding and the one end of the smoothing circuit or on a current path extending between the one end of the secondary winding and the other end of the smoothing circuit, and
wherein the controller further
complementarily turns on/off the first secondary side switching element and the second secondary side switching element.

4. The electric power converter according to claim 2, wherein the primary side drive signal turns on/off the plurality of switching elements at a fixed duty ratio and with a fixed phase, and
wherein the secondary side drive signal turns on/off the plurality of secondary side switching elements at a fixed duty ratio and with a phase that is set in accordance with the output value.

5. The electric power converter according to claim 2, wherein the secondary side rectifier circuit includes
a first secondary side diode disposed on a current path extending between one end of the secondary winding and one end of the smoothing circuit or on a current path extending between another end of the secondary winding and another end of the smoothing circuit, and
a second secondary side diode disposed on a current path extending between the other end of the secondary winding and the one end of the smoothing circuit or on a current path extending between the one end of the secondary winding and the other end of the smoothing circuit.

6. The electric power converter according to claim 1, further comprising:
a primary side rectifier circuit that rectifies an inputted AC voltage to generate the first rectified voltage.

7. An electric power converter, comprising:
a capacitor that smooths a first rectified voltage to generate a capacitor voltage;
a bridge circuit that converts the capacitor voltage to a primary side AC voltage, the bridge circuit including a plurality of switching elements;
a transformer that converts the primary side AC voltage to a secondary side AC voltage, the transformer including a primary winding connected to the bridge circuit and a secondary winding electromagnetically coupled to the primary winding;
a secondary side rectifier circuit that rectifies the secondary side AC voltage to generate a second rectified voltage, the secondary side rectifier circuit being connected to the secondary winding;
a smoothing circuit that smooths the second rectified voltage, the smoothing circuit including a secondary side capacitor and a coil which is disposed on a current path extending between the secondary side capacitor and the secondary side rectifier circuit;
a secondary side switching circuit that turns on/off electrical conduction between the secondary winding and the smoothing circuit, the secondary side switching circuit including a plurality of secondary side switching elements;
a detector that detects a value based on at least one of the capacitor voltage and a current flowing from the capacitor;

an output detector that detects an output value based on at least one of an output voltage and an output current from the smoothing circuit; and a controller that determines a phase difference between the primary side drive signal and a secondary side drive signal on the basis of the output value, outputs the secondary side drive signal to turn on/off each of the plurality of secondary side switching elements with a phase in accordance with the phase difference, and outputs a primary side drive signal to turn on/off each of the plurality of switching elements at a switching frequency, wherein the controller increases the phase difference when the output value increases, and reduces the phase difference when the output value decreases, and the controller increases the switching frequency when the detected value increases, and reduces the switching frequency when the detected value decreases.

8. The electric power converter according to claim 7, wherein the secondary side switching circuit includes a first secondary side switching element disposed on a current path extending between one end of the secondary winding and one end of the smoothing circuit or on a current path extending between another end of the secondary winding and another end of the smoothing circuit, and a second secondary side switching element disposed on a current path extending between the other end of the secondary winding and the one end of the smoothing circuit or on a current path extending between the one end of the secondary winding and the other end of the smoothing circuit, and wherein the controller complementarily turns on/off the first secondary side switching element and the second secondary side switching element by the secondary side drive signal.

9. The electric power converter according to claim 7, wherein the controller turns on/off each of the plurality of switching elements at a fixed duty ratio and with a fixed phase by the primary side drive signal, and wherein the controller turns on/off each of the plurality of secondary side switching elements at a fixed duty ratio and with a phase that is set in accordance with the output value by the secondary side drive signal.

10. The electric power converter according to claim 7, wherein the bridge circuit is a full bridge circuit that includes a first switching element disposed on a current path extending between one end of the capacitor and one end of the primary winding, a second switching element disposed on a current path extending between the one end of the capacitor and another end of the primary winding, a third switching element disposed on a current path extending between another end of the capacitor and the one end of the primary winding, and a fourth switching element disposed on a current path extending between the other end of the capacitor and the other end of the primary winding, and wherein the controller, by the primary side drive signal, turns on/off the first switching element at a fixed duty ratio and with a first fixed phase, turns on/off the fourth switching element at the fixed duty ratio and with a second fixed phase that is different from the first phase, complementarily turns on/off the second switching element relative to the fourth switching element, and complementarily turns on/off the third switching element relative to the first switching element.

11. The electric power converter according to claim 7, wherein the secondary side rectifier circuit includes a first secondary side diode disposed on a current path extending between one end of the secondary winding and one end of the smoothing circuit or on a current path extending between another end of the secondary winding and another end of the smoothing circuit, and a second secondary side diode disposed on a current path extending between the other end of the secondary winding and the one end of the smoothing circuit or on a current path extending between the one end of the secondary winding and the other end of the smoothing circuit.

12. The electric power converter according to claim 7, further comprising:

a primary side rectifier circuit that rectifies an inputted AC voltage to generate the first rectified voltage.

13. The electric power converter according to claim 7, wherein the electric power converter is an apparatus that supplies electric power to a secondary battery, and wherein the detected value is a value of the capacitor voltage.

14. An electric power converter, comprising:

a capacitor that smooths a first rectified voltage to generate a capacitor voltage;

a full bridge circuit that converts the capacitor voltage to a primary side AC voltage, the full bridge circuit including a first switching element disposed on a current path extending between one end of the capacitor and one end of the primary winding, a second switching element disposed on a current path extending between the one end of the capacitor and another end of the primary winding, a third switching element disposed on a current path extending between another end of the capacitor and the one end of the primary winding, and a fourth switching element disposed on a current path extending between the other end of the capacitor and the other end of the primary winding;

a transformer that converts the primary side AC voltage to a secondary side AC voltage, the transformer including a primary winding connected to the full bridge circuit and a secondary winding electromagnetically coupled to the primary winding;

a secondary side rectifier circuit that rectifies the secondary side AC voltage to generate a second rectified voltage, the secondary side rectifier circuit being connected to the secondary winding;

a smoothing circuit that smooths the second rectified voltage;

a detector that detects a value based on at least one of the capacitor voltage and a current flowing from the capacitor; and a controller that outputs a primary side drive signal to turn on/off the first switching element at a switching frequency and a fixed duty ratio and with a first fixed phase, turn on/off the fourth switching element at the switching frequency and the fixed duty ratio and with a second fixed phase that is different from the first fixed phase, complementarily turn on/off the second switching element relative to the fourth switching element at the switching frequency, and complementarily turn on/off the third switching element relative to the first switching element at the switching frequency, wherein the controller increases the switching frequency when the detected value increases, and reduces the switching frequency when the detected value decreases.

15. The electric power converter according to claim 14, further comprising:

a secondary side switching circuit that turns on/off electrical conduction between the secondary winding and the smoothing circuit, the secondary side switching circuit including a plurality of secondary side switching elements; and an output detector that detects an output value based on at least one of an output voltage and an output current from the smoothing circuit, wherein the smoothing circuit includes
a secondary side capacitor, and
a coil disposed on a current path extending between the secondary side capacitor and the secondary side rectifier circuit, and wherein the controller further
determines a phase difference between the primary side drive signal and a secondary side drive signal on the basis of the output value, and
outputs the secondary side drive signal to turn on/off each of the plurality of secondary side switching elements with a phase in accordance with the phase difference.

16. The electric power converter according to claim 15, wherein the secondary side switching circuit includes a first secondary side switching element disposed on a current path extending between one end of the secondary winding and one end of the smoothing circuit or on a current path extending between another end of the secondary winding and another end of the smoothing circuit, and a second secondary side switching element disposed on a current path extending between the other end of the secondary winding and the one end of the smoothing circuit or on a current path extending between the one end of the secondary winding and the other end of the smoothing circuit, and wherein the controller complementarily turns on/off the first secondary side switching element and the second secondary side switching element by the secondary side drive signal.

17. The electric power converter according to claim 15, wherein the controller turns on/off each of the first, second, third and fourth switching elements at a fixed duty ratio and with a fixed phase by the primary side drive signal, and wherein the controller turns on/off each of the plurality of secondary side switching elements at a fixed duty ratio and with a phase that is set in accordance with the output value by the secondary side drive signal.

18. The electric power converter according to claim 15, wherein the secondary side rectifier circuit includes
a first secondary side diode disposed on a current path extending between one end of the secondary winding and one end of the smoothing circuit or on a current path extending between another end of the secondary winding and another end of the smoothing circuit, and
a second secondary side diode disposed on a current path extending between the other end of the secondary winding and the one end of the smoothing circuit or on a current path extending between the one end of the secondary winding and the other end of the smoothing circuit.

19. The electric power converter according to claim 15, further comprising:

a primary side rectifier circuit that rectifies an inputted AC voltage to generate the first rectified voltage.

20. The electric power converter according to claim 15, wherein the electric power converter is an apparatus that supplies electric power to a secondary battery, and wherein the detected value is a value of the capacitor voltage.

* * * * *